(12) United States Patent
Cleary

(10) Patent No.: US 7,744,335 B1
(45) Date of Patent: Jun. 29, 2010

(54) PALLET JACK WITH INDEPENDENTLY ELEVATABLE FORK ARMS

(75) Inventor: Tamara Cleary, 200 Yellow Poplar La., Lexington, NC (US) 27295

(73) Assignee: Tamara Cleary, Lexington, NC (US)

( * ) Notice: Subject to any disclaimer, the term of this patent is extended or adjusted under 35 U.S.C. 154(b) by 182 days.

(21) Appl. No.: 10/930,141

(22) Filed: Aug. 30, 2004

Related U.S. Application Data

(60) Provisional application No. 60/509,554, filed on Oct. 8, 2003.

(51) Int. Cl.
*B66F 9/12* (2006.01)

(52) U.S. Cl. .................... 414/664; 414/495; 414/619; 414/668; 280/43.12; 187/226; 187/231; 187/237; 187/238; 254/2 R; 254/10 R

(58) Field of Classification Search ............... 414/460, 414/619, 785, 495, 607, 664, 668; 187/237, 187/226, 231, 238; 280/43.12; 254/2 R, 254/10 R
See application file for complete search history.

(56) References Cited

U.S. PATENT DOCUMENTS

| | | | | |
|---|---|---|---|---|
| 3,080,080 A | * | 3/1963 | Miller | 414/785 |
| 4,027,771 A | * | 6/1977 | Adams | 414/495 |
| 4,395,189 A | * | 7/1983 | Munten | 414/635 |
| 4,886,284 A | * | 12/1989 | Martinez, Jr. | 280/43.12 |
| 5,139,385 A | * | 8/1992 | Chase et al. | 414/667 |
| 5,174,708 A | * | 12/1992 | Ruder et al. | 414/392 |
| 5,326,217 A | * | 7/1994 | Simpson et al. | 414/635 |
| 6,260,646 B1 | * | 7/2001 | Fernandez et al. | 180/65.6 |
| 6,732,871 B1 | * | 5/2004 | Flores | 212/180 |
| 6,742,752 B1 | * | 6/2004 | Fenyves et al. | 248/346.02 |
| 6,854,552 B2 | * | 2/2005 | Yurushi | 180/253 |
| 6,883,625 B2 | * | 4/2005 | Trego et al. | 180/19.2 |
| 7,191,872 B2 | * | 3/2007 | Gramatikov et al. | 187/222 |
| 2003/0080544 A1 | * | 5/2003 | Rosenkranz | 280/762 |

* cited by examiner

*Primary Examiner*—Michael S Lowe

(57) ABSTRACT

A pallet jack with a pallet engaging fork having separate and independently movable first and second fork arms connected to independently controlled and operable first and second fork arm elevating means, for lifting a pallet loaded with a stack of items so that when the stack of items leans and is out of balance one fork arm can be elevated higher than the other to compensate and restore balance to the stack of items.

2 Claims, 5 Drawing Sheets

PALLET JACK WITH INDEPENDENTLY ELEVATABLE FORK ARMS

FILING HISTORY

This application continues from provisional application No. 60/509,554, filed on Oct. 8, 2003.

BACKGROUND OF THE INVENTION

1. Field of the Invention

The present invention relates generally to the field of commercial trucks and carts for carrying merchandise items such as various types of product containers. More specifically the present invention relates to a pallet jack with a pallet engaging fork having separate and independently movable first and second fork arms connected to independently controlled and operable first and second fork arm elevating means, for lifting a pallet loaded with a stack of items so that when the stack of items leans and is out of balance one fork arm can be elevated higher than the other to compensate and restore balance to the stack of items. The fork arm elevating means may be powered electrically, manually or by any other suitable power source. The first and second fork arm elevating means preferably include first and second hydraulic piston and cylinder assemblies drivably linked to first and second fork arm risers of conventional design. Each piston and cylinder assembly moves the corresponding fork arm riser linkages to lower fork arm wheels to elevate the corresponding fork arm and the corresponding side of a loaded pallet and to raise the fork arm wheels to lower the corresponding fork arm and the corresponding side of the loaded pallet. Apart from the fork arms being separate and independently raised and lowered by separate and independently controlled fork arm elevating means, the remainder of the pallet jack is conventional.

2. Description of the Prior Art

There have long been pallet jacks having pallet engaging lifting forks for lifting and transporting pallets loaded with containers of various products. Some pallet jacks have included hand powered hydraulic systems for elevating the lifting fork, while others have included electrically powered hydraulic systems. The lifting forks of all of these prior pallet jacks have had structurally interconnected fork arms, constraining the arms to move in unison. A problem with operating these prior pallet jacks has been that item loads on pallets are often stacked off center and off balance so that if the pallet remains level as it is lifted, the loads remain off balance and are likely to tip over while being transported.

It is thus an object of the present invention to provide a pallet jack which has separately elevatable lifting fork arms so that a pallet can be tilted while being elevated to compensate for a tilt and imbalance of a stack of items on the pallet.

It is another object of the present invention to provide such a pallet jack which alternatively can keep a pallet level while the pallet is lifted, where the load stacked on the pallet is adequately balanced.

It is still another object of the present invention to provide such a pallet jack which has lifting fork arms which can be separately raised and lowered under either manual power or electrical power.

It is yet another object of the present invention to provide such pallet jack design features which can be incorporated into a fork lift to achieve the same benefits.

It is finally an object of the present invention to provide such a pallet jack which is sturdy, relatively simple in design, reliable and easy to operate, and which is comparable in manufacturing cost to a conventional pallet jack.

SUMMARY OF THE INVENTION

The present invention accomplishes the above stated objectives, as well as others, as may be determined by a fair reading and interpretation of the entire specification.

A pallet jack manual or electric is provided, including a pallet jack frame structure; a pallet jack wheel assembly secured to the pallet jack frame structure and including a pallet jack wheel rotatably mounted relative to the pallet jack frame structure; a first fork arm elevating mechanism secured to the pallet jack frame structure; a first fork arm operationally connected to the first fork arm elevating mechanism; a second fork arm elevating mechanism secured to the pallet jack frame structure and operable independent of the first fork arm elevating mechanism; a second fork arm operationally connected to the second fork arm elevating mechanism; so that each fork arm can move simultaneous, independent, in a straight forward, level manner, upwardly and downwardly, in unison of each other; so that the fork arm can life a pallet loaded with a stack of items which leans and is out of balance with one fork arm elevated higher than the other fork arm to compensate for the lean of the stack of items and thereby restore balance to the stack of items.

The first arm elevating mechanism preferably includes a first hydraulic piston and cylinder assembly drivable linked to a first fork arm riser, the first fork arm riser including the fork arm riser wheel and wheel support element pivotal in a straight forward, level manner, upwardly and downwardly, in unison relative to the pallet jack frame structure; and where the second arm elevating mechanism includes a second hydraulic piston and cylinder assembly drivable linked to a second fork arm riser, the second for arm riser including fork arm riser wheel and wheel support elements pivotal in a straight forward, level manner, upwardly and downwardly, in unison relative to the pallet jack frame structure; so that each piston and cylinder assembly moves the corresponding fork arm riser linkage to lower the fork arm and riser wheel to elevate the corresponding fork arm and riser wheel and the corresponding side of any loaded pallet engaged by the fork arms, and to rise the fork arm and riser wheel to lower the corresponding fork arm and raiser wheel thus to lower the corresponding side of a loaded pallet, the pallet jack preferably additionally includes hydraulic lines, first and second hydraulic/pistons, hydraulic pump, reservoir, this is a conventional hydraulic pallet jack instruction whose details need not be shown, because they are completely conventional and are needed in order to operate the pallet jack independent elevating functions.

The pallet jack optionally additionally includes an electric motor, a battery power source and a first and second set of solenoid valves, where the hydraulic pump is drivable connected to the battery power source, and where the first set of solenoid valves control the rate of fluid flow into and out of the first hydraulic cylinder assembly and where the second set of solenoid valves control the rate of fluid flow into and out of the second hydraulic cylinder assembly. The pallet jack optionally additionally includes a pallet jack steering control elevating mechanism connected to the pallet jack with various controls being switches or lever means for controlling the elevating means and functions, and where the electric pump motor and the solenoid valves are operationally connected to and thus operable through the pallet jack steering control elevating mechanism. The pallet jack optionally additionally includes a pallet jack drive motor connected to and controlled by the pallet jack steering control elevating mechanism, the pallet jack drive motor being drivable connected to the pallet jack wheels to propel the pallet jack relative to a support surface on which the pallet jack rest.

The frame structure preferably includes an upright load abutment wall extending upwardly from the pallet jack engaging fork arms. A opening in the abutment wall allows the fork arms to extend upwardly with out tilting the pallet jack, and for allowing a straight forward, level upwardly and downwardly movement in unison without tilting the pallet jack. A resilient shock absorbing load bumper preferably is provided on the wall forward face to prevent impact damage to the load and pallet jack, particularly during loading.

The pallet jack alternatively includes first and second sets of manually operable valves, where the hydraulic pump has a elevating pump lever for manual operation, and where the first set of manual operable valves controls the rate of fluid flow into and out of the first hydraulic cylinder assembly for simultaneous or independently elevating the first fork arm and riser wheel in a straight forward, level manner, upwardly and downwardly, in unison and not commonly drivingly linked to the second fork arm and riser wheel, and the second set of manually operable valves control the rate of fluid flow into and out of the second hydraulic cylinder assembly for simultaneous or independently elevating the second fork arm and riser wheel in a straight forward, level manner, upwardly and downwardly, in unison and not commonly drivingly linked to the first fork arm and riser wheel.

BRIEF DESCRIPTION OF THE DRAWINGS

Various others objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
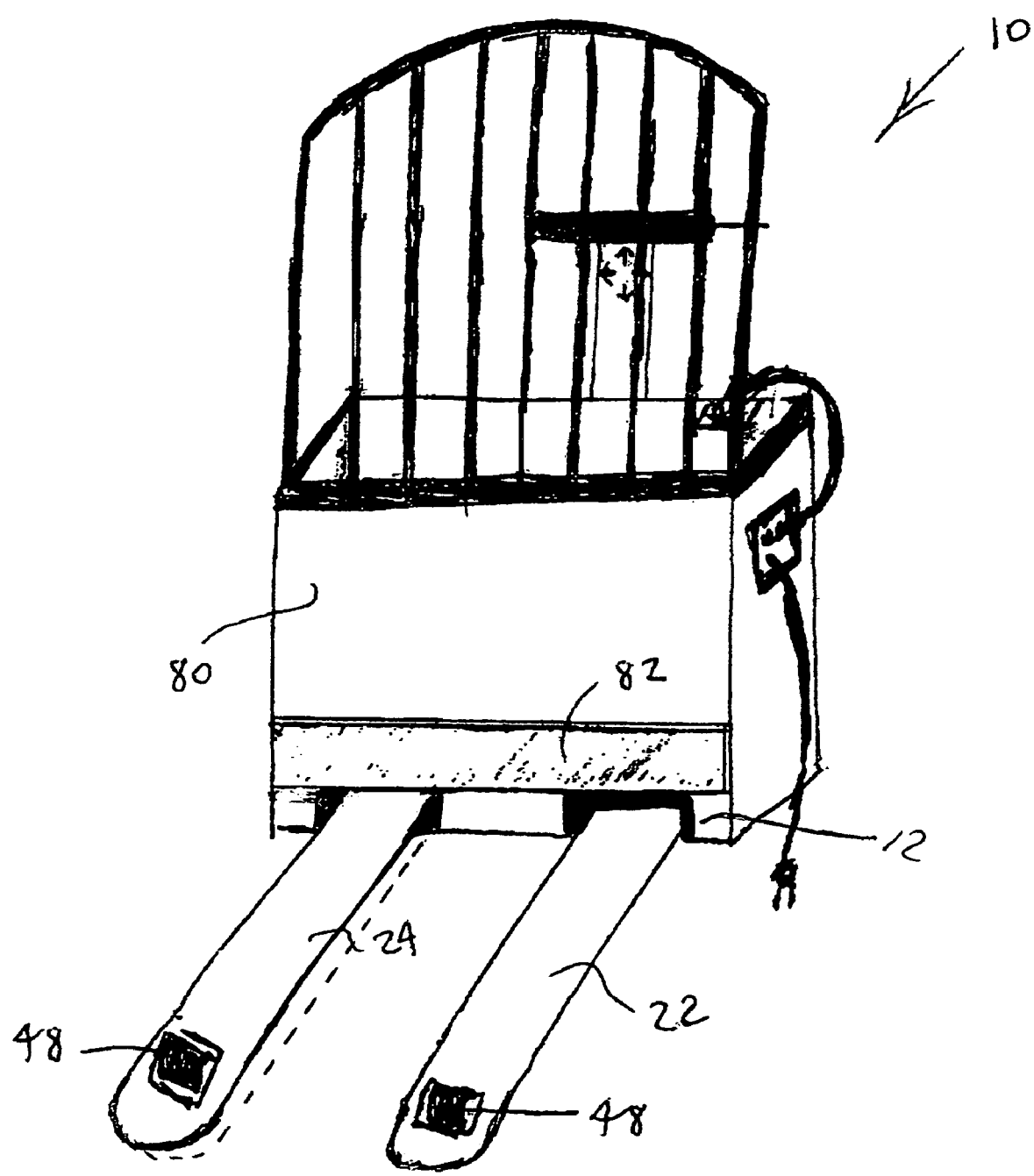
FIG. 1 Is a perspective view of an example of a pallet jack which can include the present inventive features with the frontal view of the pallet jack wall where there is an opening in the bottom wall that has allowed one fork arm to rise higher than the other while remaining level and with out tilting the pallet jack to bring into balance a tilted load (not shown) resting on the pallet.
Figure 2:
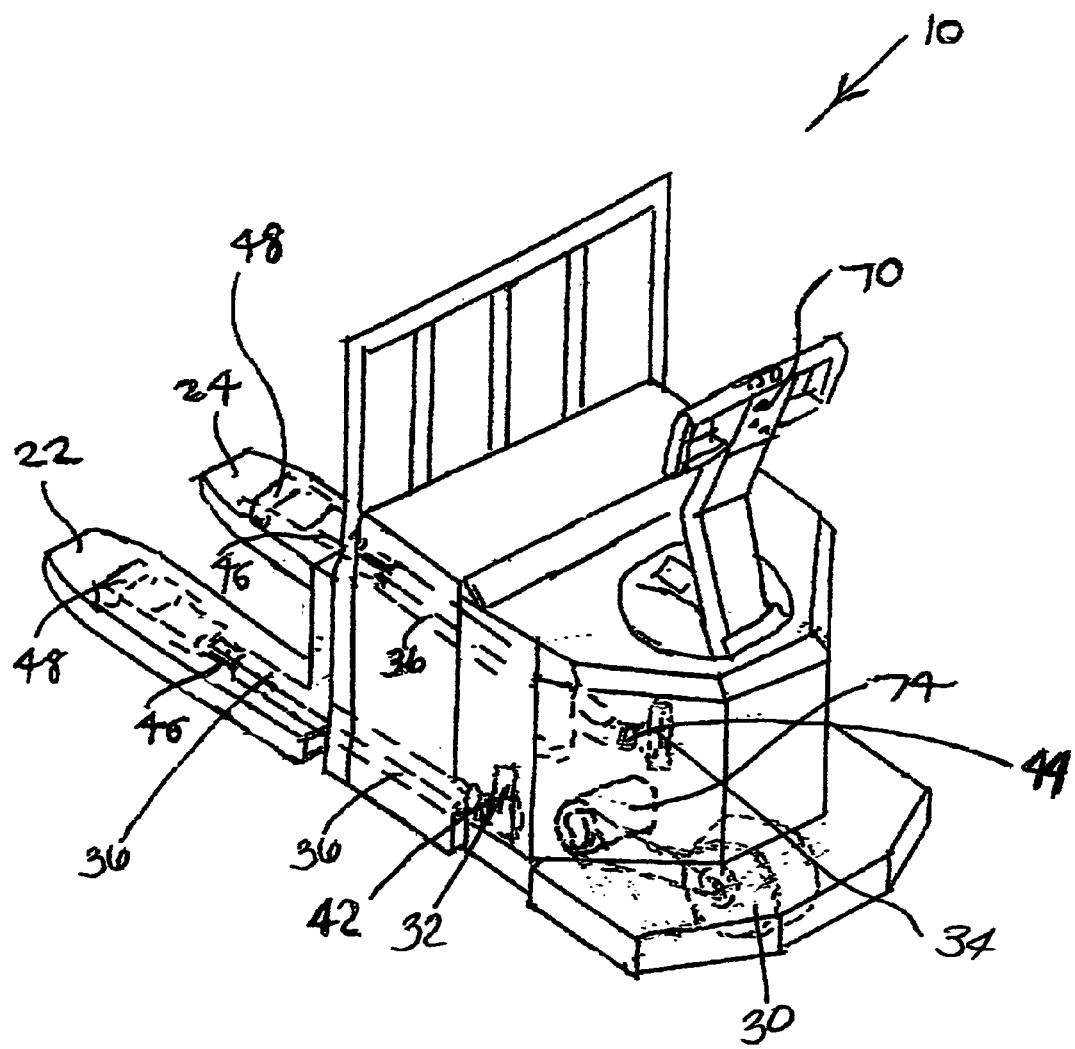
FIG. 2 Is a perspective view of an example of a pallet jack which is showing the back side view with certain external such as steering and elevating controls FIG. 3 Is a perspective view of a pallet jack showing the back side view with certain external and internal features to support claims FIG. 4 Is a fragmentary, perspective view of the elevating fork arms wheel risers as shown in FIG. 1,2
Figure 3:
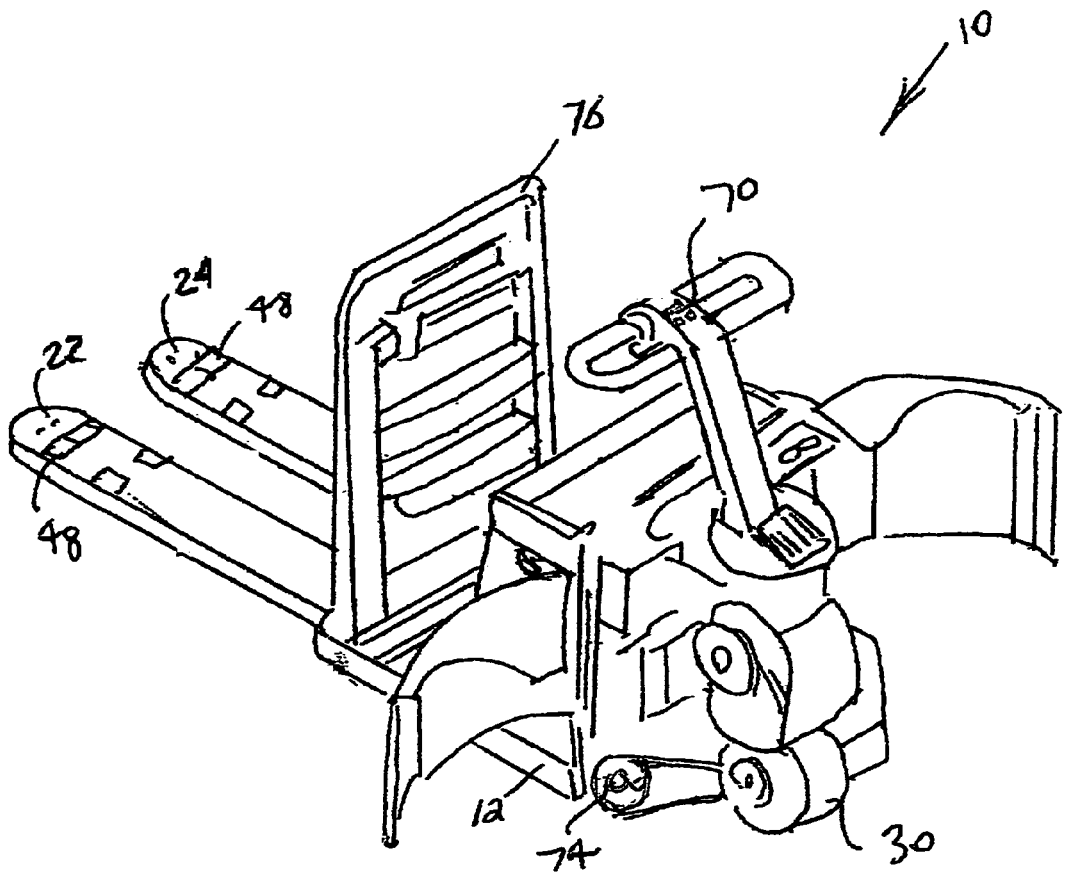
Figure 4:
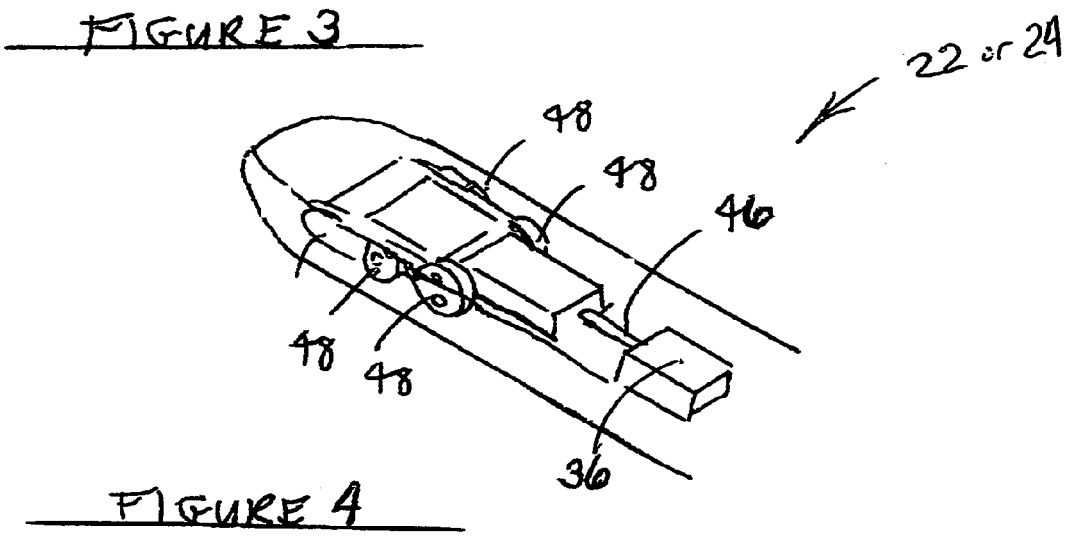
Figure 5:
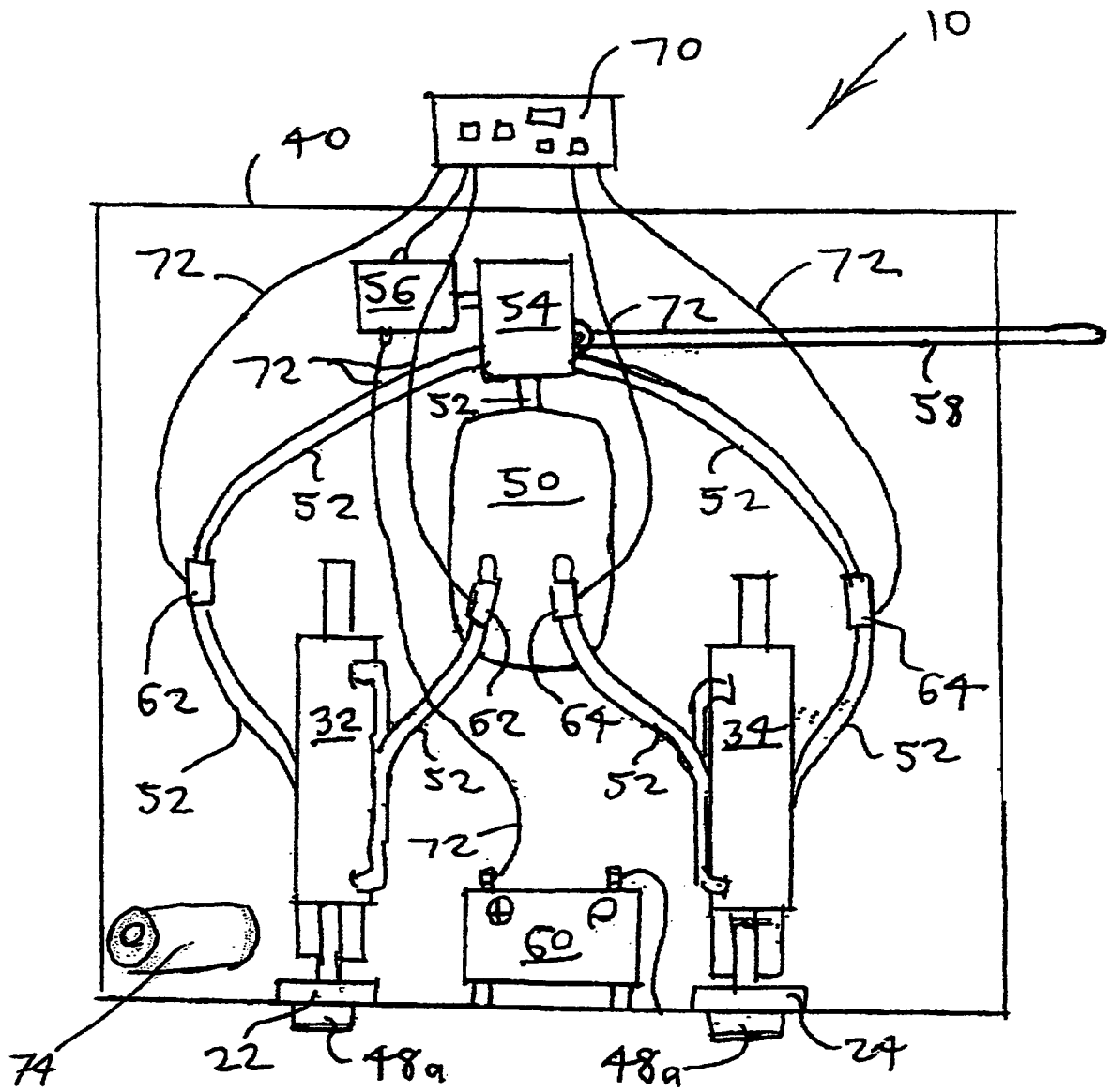
FIG. 5 Is a schematic illustration of a dual pressurized hydraulic system for separately operating the individual fork arms.
Figure 6:
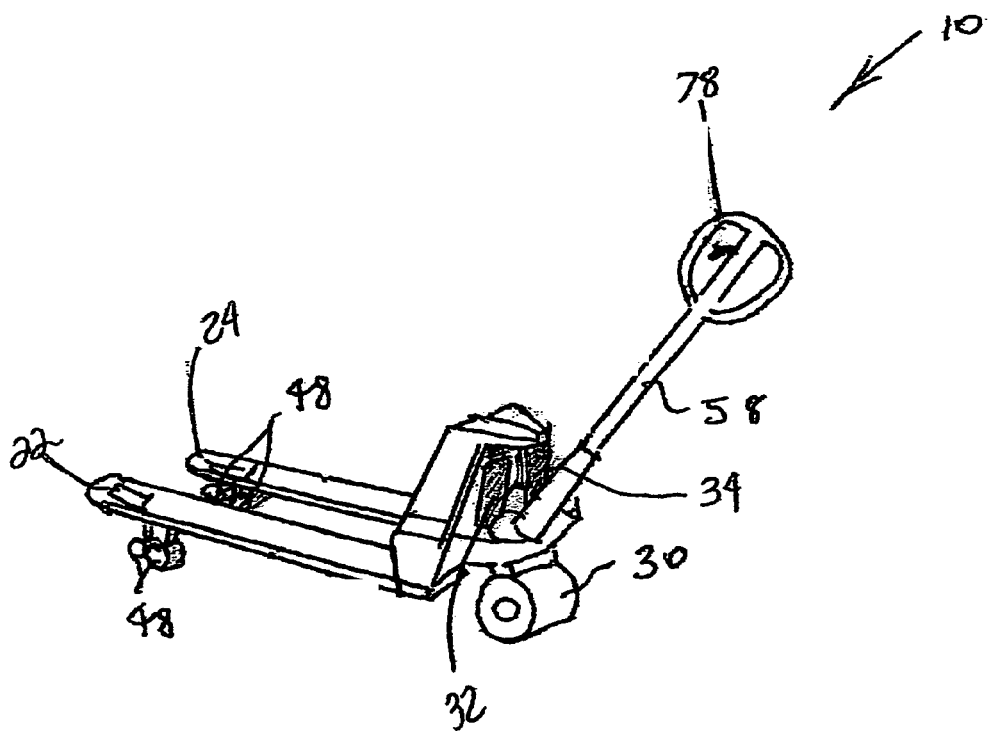
FIG. 6 Is and are the same invention bases applied to a manual pallet jack with handle and lever means of elevating one fork arm higher than the other while remaining level and with out tilting.
Figure 7:
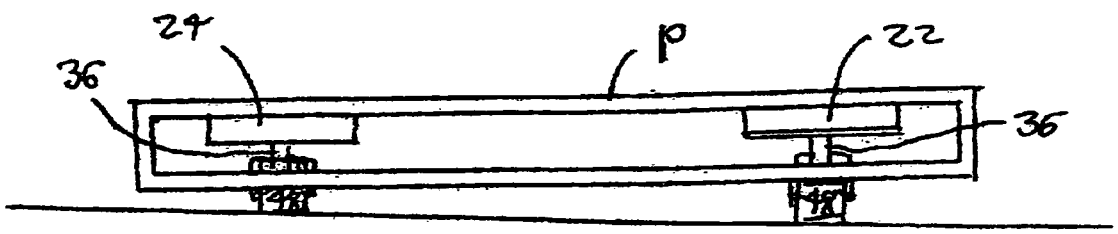
FIG. 7 Is a perspective view of a pallet being lifted with one fork arm higher than the other to show independent movement of fork arms to support claims.

Referring to FIG. 1 number 10 being the pallet jack in whole, the frame structure 12 Preferably including an upright load abutment wall 80 extending upwardly from the pallet engaging fork arms 22 and 24. While also showing the independent fork arm 22 elevated in an upwardly position and fork arm 24 in a downwardly position by means of the riser wheel 48. A resilient shock absorbing load bumper 82 preferably is provided on wall 80 forward face to prevent impact damage to the load and pallet jack 10, particularly during loading. Referring to FIG. 2 The first and second fork arm 22 and 24 elevating means 32 and 34 preferably including first and second hydraulic piston and cylinder assemblies 32 and 34 drivable linked to first and second fork arm raisers 42 and 44. Each piston and cylinder assembly 32 and 34 moves the corresponding fork arm riser linkages 46 and fork arm 22 and 24 to lower fork arm wheels 48 simultaneously or independently to elevate the corresponding fork arm 22 and 24 and the corresponding side of a loaded pallet, and raise the fork arm riser wheel 48 to lower the corresponding fork arm 22 or 24 and the corresponding side of the loaded pallet. Each fork arm riser 42 and 44 includes wheel support elements in the form of wheel struts 36 pivotably connected at its upper end to the given fork arm 22 and 24, a fork arm riser wheel 48 being rotatable mounted to the wheel strut 36 lower end. Fork arm riser linkages 46 interconnect wheel strut 36 of the given fork arm 22 and 24 and the corresponding first and second hydraulic piston and cylinder assembly 32 or 34, and extend substantially parallel to fork arms 22 and 24. The wheel struts 36 are pivoted upwardly toward a horiziontal orientation to lower the corresponding fork arm 22 and 24 and are pivoted downwardly toward a vertical orientation to bear against the support surface on which the pallet jack 10 rest and thereby raise the corresponding fork arm 22 and 24. Referring to FIG. 3 A pallet jack 10 is disclosed with a pallet jack frame structure 12 riding on pallet jack wheels 30, and drive motor 74, and a pallet engaging fork arm 22 and 24 mounted to frame structure 12 and having separate and independently movable first and second fork arms 22 and 24 respectively connected to independently controlled and operable first and second fork arm elevating means 32 and 34, (see FIGS. 2 and 5) respectively, for lifting a pallet loaded with a stack of items so that when the stack of items leans out of balance one fork arm 22 or 24 can be elevated higher than the other fork arm 22 or 24 to compensate and restore balance to the stack of items. Alternatively, the fork arms 22 and 24 can be elevated and lowered in unison to keep a pallet level where the pallet has a balanced upright load. Thus operated by a steering control elevating mechanism 70. Showing the safety bar on the electric pallet jack 76. FIG. 4 The elevating pallet engaging fork 22 and 24 fragmentary showing corresponding fork arm riser linkage 46 and the forkarm wheels 48 elevate the pallets. FIG. 5 Apart from the fork arms 22 and 24 being separate and independently raised and lowered by separate and independently controlled fork arm elevating means 32 and 34, the remainder of the pallet jack 10 preferably is conventional. For the preferred piston and cylinder assembly fork arm elevating means 32 and 34, the hydraulic system and the electric power and control system within the pallet jack mechanism housing 40 are substantially as found in existing pallet jacks. First and second hydraulic piston and cylinder assemblies 32 and 34 preferably are connected by hydraulic lines 52 to a common reservoir 50 of pressurized hydraulic fluid which in turn is connected to a hydraulic pump 54, defining a closed hydraulic fluid circulation cycle. The hydraulic pump 54 is powered by an solar or electric pump motor 56 connected to a battery power 50 source 60 and separate sets of valves 62 and 64 control the rate of fluid flow into and out of the first and second hydraulic cylinder assemblies 32 and 34. Valves 62 and 64 preferably are solenoid valves, but alternatively may be manually operable valves. the electric pump motor 56 and solenoid controlled valves 62 and 64 are connected to a pallet jack steering control elevating mechanism 70 by control circuit wires 72 and are thus operated by switches rheostats on the steering control elevating mechanism 70. A pallet jack drive motor 74 (see FIGS. 2 and 3) by conventional means to propel the pallet jack 10 forwardly, side to side, rearward, and conventional steering means (not shown) are also provided. FIG. 6 With 10 being the pallet jack in whole terms, the independently controlled and operable fork arm elevating means 32 and 34 may be powered manually rather than electrically. For manual hydraulic piston and cylinder assemblies 32 and 34, the hydraulic pump 54 (see FIG. 5) preferably is connected to a manually operated pump lever 58, and set of solenoid vales 62 and 64 (see FIG. 5) are replaced with manually operated valves. Each piston and cylinder assembly 32 and 34 moves corresponding fork arms 22 and 24 to lower 65 and raise the fork arm riser wheel 48. For manual operated 58 also being the brake, as on the conventional pallet jack. The lever 78 being the hydraulic pump release lever for lowering the fork arm raiser wheels for manual operation. It is believed that most conventional manual, as well as electrical, pallet jack fork elevating mechanisms could be modified to operate the independent fork arm elevating means 32 and 34 of the present invention. Many other electric and manual designs are contemplated, with and without hydraulic means. FIG. 7 Is a frontal view of a pallet being lifted by means of a pallet engaging fork arm 22 and 24 and having fork arm 22 tilted upwardly slightly higher than fork arm 24 in order to restore balance to a leaning pallet with product (not shown). The wheel strut 36, on fork arm 22 is pivoted 75 upwardly toward a horizontal orientation to raise fork arm wheel 48, while the wheel strut 36 on the fork arm 24 is pivoted downwardly toward a vertical orientation to lower fork arm wheel 48 while fork arm 22 and 24 staying straight forward, and in a level manner. While the invention has described, disclosed, illustrated and shown in various terms or certain embodiments or modifications which it has assumed in practice, the scope of the invention is not intended to be, nor should it be, limited thereby and such other modifications or embodiments as may be suggested by the teachings within the drawings wherein for the purpose of illustration is shown a preferred embodiment of the invention and is not to be limited by the embodiments shown in the drawings and described in the description, which are given by way of example and not of limitation, but only in accordance with the scope of the appended claims.

I claim as my invention:

1. A manual or electric, walk along or stand on, pallet jack comprising:

a pallet jack frame structure with at least one pallet jack wheel mounted on pallet jack wheel mounting means to be rotatable relative to the pallet jack frame structure;

a steering control elevating mechanism connected to the pallet jack with various controls for operating the pallet jack on which there is provided switches or lever means for controlling pallet jack functions, including switches or lever means for drive motor speed controllers for simultaneous or independently moving each of first and second fork arms and wheel risers to separately control the first fork arm and second fork arm to individually elevate each of the forks in a horizontal, level manner into abutment with a load or lower each of the forks in a level manner together in unison to set the load down in place, the first fork arm and wheel riser staying on a horizontal and level manner, moving upwardly and downwardly in unison, but independent of the second fork arm and wheel riser, the second fork arm and wheel riser staying in a horizontal and level manner, moving upwardly and downwardly in unison, but independent of the first fork arm;

a separately controlled first fork arm elevating means having a first hydraulic piston and cylinder assembly drivingly linked to the first fork arm wheel riser and not commonly drivingly linked to the second fork arm wheel riser, the first fork arm wheel riser elevated by at least one arm riser wheel support element that pivots upward and downwardly relative to the pallet jack frame from an underside of the first fork arm and operable simultaneously or independently with a separately controlled second fork arm elevating means, keeping the fork arms horizontal and level manner at all times, with movement directed upwardly and downwardly;

wherein the first fork arm is operationally connected to the first fork arm elevating means having the various controls to separately control the first fork arm elevating means, such that the first fork arm has its own wheel lifting means which is operable simultaneously or independently, keeping the first fork arm in a horizontal and level manner, upwardly and downwardly in unison with wheel lifting means of the second fork arm;

the separately controlled second fork arm elevating means having a second hydraulic piston and cylinder assembly drivingly linked to the second fork arm wheel riser, and not commonly drivingly linked to the first fork arm wheel riser, the second fork arm wheel riser elevated by at least one arm wheel riser support element that pivots upwardly and downwardly relative to the pallet jack frame structure from an underside of the second fork arm and operable simultaneously or independently of the first fork arm elevating means, keeping the fork arms in a horizontal and level manner at all times with movement upwardly and downwardly;

wherein the second fork arm is operationally connected to the second fork arm elevating means having the controls to separately control the second fork arm elevating means;

such that the second fork arm has its own wheel lifting means which is operable simultaneously or independently, keeping the second fork arm in a horizontal level manner, upwardly and downwardly, in unison with the wheel lifting means of the first fork arm;

wherein the fork arms are operable to lift a pallet loaded with a stack of items and each piston and cylinder assembly moves the corresponding fork arm wheel riser to elevate the corresponding fork arm, and to lower the corresponding fork arm wheel riser to lower the fork arm to adjust a stack of items which leans and is out of balance with one fork arm higher than the other fork arm to compensate for the lean of the leaning stack of items and thereby restore balance to the stack of items;

wherein the pallet jack frame includes a solid front surface encasing the first and second fork arms with openings configured to allow purely vertical movement of the first and second fork arms;

and wherein the various controls comprise a first and second set of manually operable valves, wherein a hydraulic pump has a elevating pump lever for manual operation, and wherein a first set of manually operable valves control the rate of fluid flow into and out of the first hydraulic piston and cylinder assembly for simultaneously or independently elevating the first fork arm and wheel riser in a horizontal and level manner, upwardly and downwardly, in unison and not commonly linked to the second fork arm and wheel riser, and where a second set of manually operable valves control the rate of fluid in and out of the second hydraulic piston and cylinder assembly for simultaneously or independent elevating the second fork arm and wheel riser in a horizontal and level manner, upwardly and downwardly, in unison and not commonly linked to the first fork arm and wheel riser.

2. A method of carrying one or more pallets at one time comprising:
providing the pallet jack of claim 1;
providing a rechargeable battery;
inserting the first and second fork arms into right and left slots of a pallet of the one or more pallets;
after inserting the fork arms into the slots, using the various controls to independently change the elevations of each fork arm and wheel riser by differing amounts in a level manner so that a heavier leaning side of the pallet has the associated fork arm and wheel riser on that side controlled to elevate to a greater amount so as to achieve a higher level than the other side of the pallet over the associated fork arm and wheel riser bearing less weight which is elevated a lesser amount, providing a tilting force to the leaning pallet and thereby raising and supporting the pallet in a more balanced and up right position for safer transport from one resting place to another resting place with each associated fork arm and wheel riser at all times elevated in a horizontal and level manner by the differing amounts upwardly or downwardly in order to straighten a unbalanced load and distribute the weight to a more even and safe position.

* * * * *